(12) United States Patent
Rossberg et al.

(10) Patent No.: US 11,193,849 B2
(45) Date of Patent: Dec. 7, 2021

(54) TEST DEVICE AND MEASUREMENT METHOD

(71) Applicant: Bayerische Motoren Werke Aktiengesellschaft, Munich (DE)

(72) Inventors: Dirk Rossberg, Deutenhausen (DE); Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 248 days.

(21) Appl. No.: 16/550,943

(22) Filed: Aug. 26, 2019

(65) Prior Publication Data
US 2019/0376871 A1    Dec. 12, 2019

Related U.S. Application Data

(63) Continuation of application No. PCT/EP2018/051257, filed on Jan. 19, 2018.

(30) Foreign Application Priority Data

Feb. 27, 2017 (DE) .................... 10 2017 203 110.7

(51) Int. Cl.
*G01M 3/28* (2006.01)
*G01B 11/245* (2006.01)

(52) U.S. Cl.
CPC ......... *G01M 3/2807* (2013.01); *G01B 11/245* (2013.01)

(58) Field of Classification Search
CPC ............. G01M 3/2807; G01M 3/2838; G01M 3/2815; G01B 11/245
See application file for complete search history.

(56) References Cited

U.S. PATENT DOCUMENTS

2012/0126151 A1* 5/2012 Pugh ....................... E21B 47/04
                                                              250/559.26

FOREIGN PATENT DOCUMENTS

| DE | 41 32 433 A1 | 4/1993 |
| DE | 199 31 676 A1 | 1/2001 |
| DE | 10 2013 103 108 A1 | 10/2014 |

OTHER PUBLICATIONS

International Search Report (PCT/ISA/210) issued in PCT Application No. PCT/EP2018/051257 dated Jun. 25, 2018 with English translation (eight (8) pages).
German-language Written Opinion (PCT/ISA/237) issued in PCT Application No. PCT/EP2018/051257 dated Jun. 25, 2018 (nine (9) pages).
German-language Search Report issued in counterpart German Application No. 10 2017 203 110.7 dated Dec. 4, 2017 with partial English translation (11 pages).

* cited by examiner

*Primary Examiner* — Peter J Macchiarolo
*Assistant Examiner* — Anthony W Megna Fuentes
(74) *Attorney, Agent, or Firm* — Crowell & Moring LLP

(57) ABSTRACT

A test device including two measuring systems is provided. The test device includes a first measuring system which is configured for leakage testing of a test object, and a second measuring system which is configured for dimensional checking of the test object. The first measuring system has at least one connecting region, by which a test medium can be introduced into the test object. The test object can be set into rotation via the at least one connection region, on which the dimensional checking is based.

14 Claims, 1 Drawing Sheet

TEST DEVICE AND MEASUREMENT METHOD

CROSS REFERENCE TO RELATED APPLICATIONS

This application is a continuation of PCT International Application No. PCT/EP2018/051257, filed Jan. 19, 2018, which claims priority under 35 U.S.C. § 119 from German Patent Application No. 10 2017 203 110.7, filed Feb. 27, 2017, the entire disclosures of which are herein expressly incorporated by reference.

BACKGROUND AND SUMMARY OF THE INVENTION

The present invention relates to a test device and to a measurement method, in particular for line systems for automotive applications.

In automobile manufacturing, lines, such as coolant lines (combination of machined and formed aluminum pipes, partially combined with formed and shaped rubber hoses), are currently checked after manufacturing for dimensional accuracy in a gage and subsequently for leak tightness in a helium test chamber. Such gages are expensive, however, in particular because they must always be produced individually with respect to the component. In addition, this approach always requires the two steps of dimensional accuracy measurement and the subsequent leak tightness test, or vice versa, and is therefore very lengthy.

It is therefore an object of the present invention to specify a test device and a measurement method that eliminate the aforementioned disadvantages and provide an approach that is beneficial in terms of time and cost.

This and other objects are achieved by a test device and by a measurement method in accordance with embodiments of the invention. Further advantages and features are apparent from the claims and the description and the appended figures.

According to an embodiment of the invention, a test device includes a first measurement system that is adapted for a leak tightness test of a unit under test, and a second measurement system that is adapted for a dimensional check of the unit under test. The first measurement system has at least one connector region via which a test medium can be fed into and/or discharged from the unit under test. The unit under test is able, via the at least one connector region, to be set in a rotation on which the dimensional check is based. According to a preferred embodiment, the unit under test is a line, in particular a coolant line, in or for automotive applications, or is a combination of lines. Such a line includes, for example, a combination of machined and formed metal pipes, for example aluminum pipes, partially combined with formed and shaped rubber hoses. These carry for example the coolant of the air-conditioning system, such that the leak tightness thereof is indispensable for the operation thereof.

As mentioned in the introductory part, it is known from the prior art to test such (coolant) lines for automotive applications after their manufacturing for dimensional accuracy in a gage and subsequently for leak tightness in a test chamber (or vice versa), wherein the gages required therefor are, however, very costly. In addition, the method is highly complex because the two steps "dimensional accuracy measurement" and "checking the leak tightness" always need to be performed. In the present case, the at least one connector region via which the test medium can be fed into (or discharged again from) the unit under test is advantageously provided both for accommodating and holding the unit under test, and also for displacing it, turning it or setting it in rotation. This displacement or movement of the unit under test is advantageously used for the dimensional check.

The dimensional check is expediently an optical measurement, in particular a three-dimensional optical measurement. To this end, the unit under test is expediently set in a fixed rotation, in particular having a constant rotational speed. The resulting rotation body can be interrogated via the first measurement system with respect to stored limit samples. To this end, corresponding limit samples (large and small) of the respective component have been previously measured, for example, to store the resulting envelopes of the rotation bodies. Compared with the prior art, it is thus possible to dispense with costly gages. In addition, it is possible to achieve a significant time saving because the leak tightness test and the dimensional check can be performed at the same time, at least in large parts. It should be noted that it is particularly advantageous that a check of the dimensional stability of the unit under test is made possible in a very simple manner and immediately when pressure is applied to said unit under test.

The test medium is preferably a test gas. In a leak tightness test, also referred to as a leak test, lines, channels, containers etc., carrying liquids or gases are checked for leakages and leak tightness. The aim of the leak tightness test is the early detection of material faults, tears etc.

Possible test gases are, for example, air, nitrogen, hydrogen, forming gas, or in particular helium. The leak tightness measurement can be effected for example following a measurement of the absolute pressure or on the basis of a pressure drop that is detected in the unit under test. According to a preferred embodiment, the leak tightness test is performed with the test gas helium. To this end, test gas entering the unit under test or exiting the unit under test is measured using a correspondingly arranged mass spectrometer. Typical test pressures here lie in a region of approximately 60 bar, and can also be extended, depending on the component being examined, for example to 250 bar.

According to one embodiment, the unit under test, in particular the coolant hose line of an air conditioning circuit or cooling circuit of a motor vehicle, is evacuated and filled with coolant. A test pressure is applied by way of nitrogen, helium or compressed air, which in suction lines lies in a region of approximately 20 bar and in pressure lines in a region of approximately 35 bar. The test time in series production is approximately 20 seconds. The entire test is effected as per preferred embodiments as part of an integral and chamber test. During the integral chamber test, pressure is applied to the unit under test. The test gas exiting via leakages is homogenized in a bell jar surrounding the unit under test, for example by way of a fan. The gas concentration can be ascertained by a gas sample being taken.

Expediently, the at least one connector region is mounted so as to be able to be turned about a turning axis. Expediently, it is possible in this way to turn or rotate the unit under test, connected to the connector region, about the turning axis. The unit under test, in other words the component that is to be checked, such as for example the coolant line, has to this end corresponding connectors (or at least one), wherein the latter is here preferably already the final connector or connectors with which the component is ultimately also installed in the vehicle.

According to one embodiment, the at least one connector region is arranged or provided on a support element that is mounted so as to be able to be turned (or turnable) about an axis of rotation. The at least one connector region and/or the support element can thus be mounted so as to be able to be turned. The support element as per one embodiment is for example a (substantially planar) plate that extends substantially transversely to the axis of rotation or the turning axis of the connector region. Expediently, the at least one connector region is arranged or positioned on the support element. According to one embodiment, it is also possible for a plurality of connector regions to be arranged on a support element, expediently at different positions. Expediently, the connector regions on the support element are also displaceable, in particular movable, such as by sliding, for example from the center of the support element to a peripheral region etc. To this end, the support element has for example a rail system on which the at least one connector region can be arranged movably, in particular also continuously, in particular for example radially movably with respect to the axis of rotation of the support element.

According to a preferred embodiment, two support elements are provided opposite one another, wherein preferably at least one connector region is provided on each support element. Advantageously, the unit under test that is to be examined can in this arrangement be arranged or positioned in-between. Expediently, the unit under test to be examined is attached to the corresponding connector regions between the two support elements. To this end, the aforementioned connectors of the unit under test are used. Expediently, the unit under test is thus clamped or fixed via the connector regions, wherein the feeding and/or discharging of the test medium used for the leak tightness test can be effected via the connector regions.

A possibly off-center arrangement of the connector regions on the support element also makes possible the arrangement of units under test having connections that are not located on an axis. By providing a variable connector region, the test device can be set individually to the objects/units under test to be measured. As already indicated, a plurality of connector regions per support element can also be provided so as to be able to provide this flexibility, for example one centrally and one off-center, wherein "center" means "on the axis of rotation."

The connector regions can be mounted so as to be able to be turned, or not, in particular relative to the respective support element, as a result of which the flexibility of the test device can be increased further. To this extent, the unit under test can be set in rotation indirectly and/or directly via the at least one connector region. In principle, the aforementioned rotations of the connector regions or the support elements are effected for example by way of more suitable electrical drives and/or hydraulic and/or pneumatic systems.

Expediently, the unit under test can also have more than one or two, for example three, four or more, connectors, which are then connected to correspondingly positioned connector regions. The test medium in this case is fed for example only via one connector region.

According to one embodiment, a distance between the support elements along the axis of rotation relative to one another is variable. Expediently, it is thus possible to react to units under test or objects to be measured having different lengths.

According to one embodiment, the at least one connector region has a linking region that is embodied for the form-fit and/or force-fit arrangement of the unit under test, and wherein the inclination/angle thereof relative to the axis of rotation or the turning axis is variable. To this extent, it is not necessary for the unit under test or the connectors thereof to have a specific position relative to the connector region or to the support element. Expediently, the connector region, or the linking region thereof, is embodied flexibly, for example via a hinge function or a spherical joint, such that an adaptation of the test device to the geometry of the respective unit under test is ensured. For the remainder, seals, such as shaft seals (cf. coolant compressors), known from the prior art can be used to seal off the connector region with respect to the support element.

Expediently, the dimensional check or the three-dimensional optical measurement is an optical rotation measurement. To this end, the unit under test is expediently set in a fixed rotation, in particular with a constant rotational speed, during the measurement. The resulting rotation body is interrogated with respect to limit samples by way of camera interrogation. Expediently, a limit sample (large or small) has been previously measured so as to store the resulting envelopes of the rotation bodies.

Expediently, the second measurement system comprises an image capturing system that includes at least two image capturing units, in particular cameras.

According to one embodiment, this is consequently not a detailed 3D measurement of the unit under test, but a capturing of a rotation body that has been set in rotation or made to perform a rotational movement, or the envelope(s) thereof. This approach permits making a fast and effective decision with respect to the quality of the corresponding component.

Alternatively, it is for example also possible to use optical 3D measurement methods by way of stripe projection. Here, the unit under test is illuminated with a stripe pattern from an LED projector and captured from different viewing angles by three cameras with a multi-image recording method. The use of laser technology, in particular laser light section sensors that are able to scan surface profiles, wherein the captured data can be evaluated using a special software, is also possible.

According to one preferred embodiment, the first measurement system is embodied as a helium tightness bank, wherein the second measurement system is designed so as to enable optical, in particular three-dimensional, measurement of a component or unit under test. The first measurement system preferably permits integral chamber testing, as already described. According to one embodiment, the leak tightness test is supplemented such that it is also possible to identify any location of the leakage if present. Expediently, a helium tightness test is here thus combined with an optical measurement, in particular with an optical rotation measurement. It is thus possible to advantageously perform a helium tightness test at the same time as a dimensional accuracy measurement. Expensive and complicated gages and holders for the units under test, in particular for the lines, can be dispensed with. Due to the variable configuration of the test device with the rotatable unit under test, combined with the camera interrogation of the resulting rotation body, it is possible to test a large number of different units under test in a facility with short setup times and check for dimensional accuracy. Due to the variably settable connector regions of the test device, for example on the support element or elements, components or lines of a variety of geometries and dimensions can be measured and checked, in particular including the pose of any connectors.

A detailed description of the first and the second measurement system is dispensed with in the present case because the underlying measurement methods can be selected as per the tasks, and are not limited to any specific type. What is important is the combination of the two measurement systems in the afore-described manner.

The invention is directed at a measurement method, in particular for line systems of automotive applications, comprising the acts of:

providing a first measurement system for a leak tightness test of a unit under test;

providing a second measurement system for an, in particular optical, dimensional check of the unit under test; and performing the dimensional check during the leak tightness test.

The method expediently furthermore comprises the acts of:

providing at least one connector region and connecting or linking to the unit under test for feeding a test medium into the unit under test; and displacing, in particular turning or rotating, the connected or linked unit under test for the dimensional check, indirectly or directly via the at least one connector region.

Expediently, the displacement is a rotation that is effected with a specified and in particular constant rotational speed, and the dimensional check is based on the measurement of envelopes.

The method expediently furthermore comprises the act of:

measuring at least one limit sample for assessing a dimensional deviation of the unit under test.

For the measurement method according to the invention, the advantages and features mentioned in connection with the test device apply analogously and accordingly, and vice versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
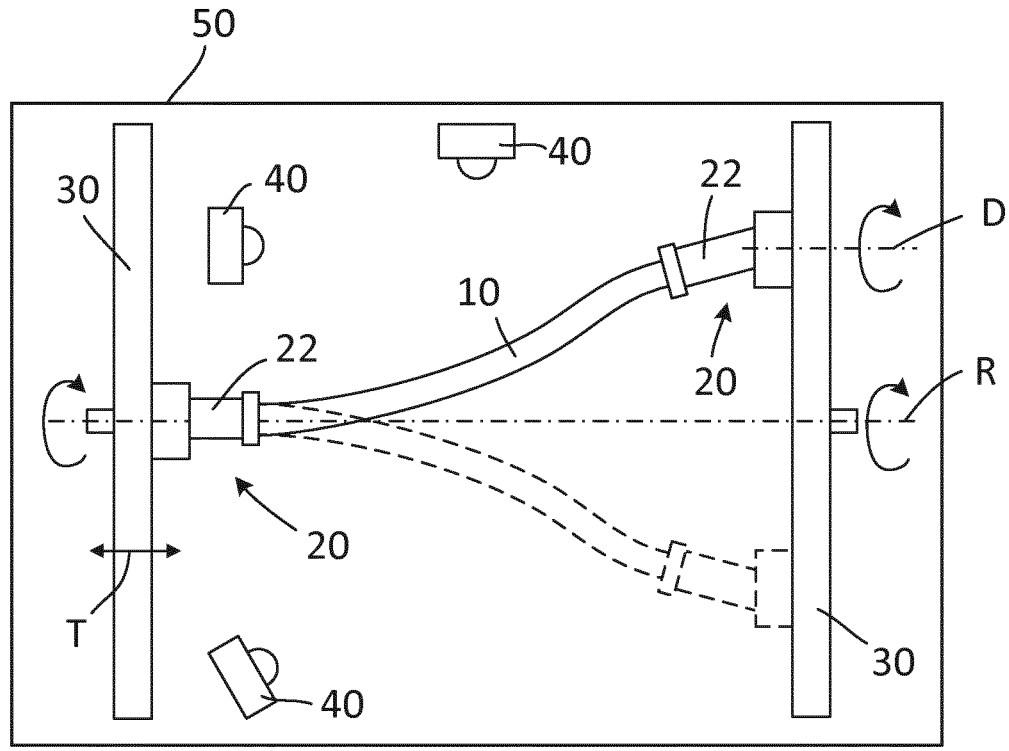
FIG. 1 is a schematic illustration of an embodiment of a test device.

FIG. 1 shows a test device, including a first and a second measurement system, wherein only individual parts of said measurement system are illustrated in the manner of a sketch. For example, a unit under test 10, for example a (coolant) line for automotive applications, is shown in principle and is arranged or clamped/fastened between two connector regions 20 of a first measurement system. In addition to the clamping or fixing, the feeding or discharge of a test medium, for example of a test gas, such as helium, is effected at the same time via the connector regions 20. The connector regions 20 are arranged in each case on a support element 30 that extends substantially perpendicularly to an axis of rotation R. The support elements 30 can rotate about the axis of rotation R, as is illustrated by the arrows. The double-headed arrow designated with the reference sign T illustrates that the support element 30 (possibly both) can be moved along the axis of rotation R to make an adaptation to different lengths of the unit under test 10 possible. A resulting rotation body, formed by the rotating unit under test 10 (cf. also the dashed illustration), can be recorded and processed by the second measurement system, including an image capturing system that in the embodiment shown here has three image capturing units 40 in the form of cameras. It can also be seen that the connector regions 20 include linking regions 22 that can be adapted to a geometry or position, pose or orientation of the unit under test 10, in particular to a pose or position of the connectors thereof. The reference sign D furthermore indicates a turning axis about which the connector region 20 can be turned possibly relative to the support element 30. The functionality thereof is used when the corresponding connector regions 20 are located on a common axis, for example the axis of rotation R, as is the case for example in FIG. 2. The reference sign 50, finally, indicates a housing 50. As for the rest, the further parts or components of the measurement systems and the required software and hardware are not illustrated.

Figure 2:
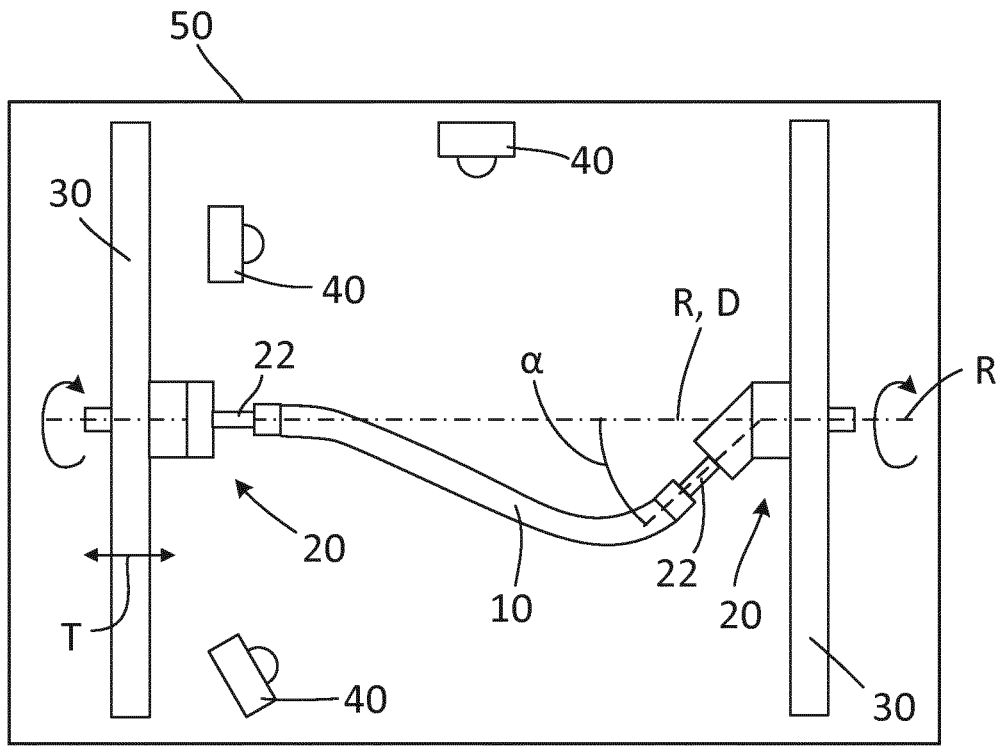
FIG. 2 is a further schematic illustration of an embodiment of a test device.

FIG. 2 shows substantially a test device, as is already known from FIG. 1. However, the reference sign a here indicates an angle that indicates an inclination of a linking region 22 of a connector region 20 in relation to an axis of rotation R or a turning axis D. Said angle makes an adaptation of the test device to a geometry or alignment of a unit under test 10 possible. For the remainder, the features are known from FIG. 1, and reference to them is made here.

LIST OF REFERENCE SIGNS 10 unit under test, line
20 connector region
22 linking region
30 support element
40 image capturing unit, camera
50 housing
α inclination angle
R axis of rotation
D turning axis
T length adaptation The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A test device, comprising:
a first measurement system that is configured for a leak tightness test of a unit under test; and
a second measurement system that is configured for a dimensional check of the unit under test, wherein
the first measurement system includes at least one connector region via which a test medium is introducible into the unit under test and which is provided for receiving or holding the unit under test,
the unit under test is settable, via the at least one connector region, into a rotation on which the dimensional check is based, and
the at least one connector region is mounted so as to be centered on and turnable about a turning axis.

2. The test device according to claim 1, wherein
the dimensional check is a three-dimensional optical measurement.

3. The test device according to claim 1, wherein
the at least one connector region is arranged on a support element that is mounted so as to be turnable about an axis of rotation.

4. The test device according to claim 3, wherein
a position of the at least one connector region on the support element is variable.

5. The test device according to claim 3, wherein
two support elements are provided opposite each other and
the at least one connector region is provided on each support element.

6. The test device according to claim 5, wherein
a distance between the support elements relative to each other is variable.

7. The test device according to claim 3, wherein the at least one connector region has a linking region that is adapted for a form-fit and/or force-fit arrangement of the unit under test, and wherein an inclination of the linking region relative to the axis of rotation or the turning axis is variable.

8. The test device according to claim 1, wherein
the dimensional check is an optical rotation measurement.

9. The test device according to claim 1, wherein
the second measurement system comprises an image capturing system including at least two cameras.

10. The test device according to claim 1, further comprising:
a housing.

11. A measurement method, comprising the acts of:
providing a first measurement system for a leak tightness test of a unit under test, wherein the first measurement system includes at least one connector region via which a test medium is introducible into the unit under test and which is provided for receiving or holding the unit under test, and wherein the at least one connector region is mounted so as to be centered on and turnable about a turning axis;
providing a second measurement system for a dimensional check of the unit under test, wherein the unit under test is settable, via the at least one connector region, into a rotation on which the dimensional check is based;
connecting the unit under test to the at least one connector region;
turning or rotating the unit under test for the dimensional check; and
performing the dimensional check during the leak tightness test.

12. The measurement method according to claim 11, wherein
the turning or rotating is effected with a specified speed, and
the dimensional check is based on a measurement of envelopes of rotation bodies.

13. The measurement method according to claim 11, further comprising the act of:
measuring at least one limit sample for assessing a dimensional deviation of the unit under test.

14. The measurement method according to claim 11, wherein
the measurement method is used for line systems of automotive applications.

* * * * *